Dec. 15, 1931.  D. H. REEVES  1,836,040
REFRIGERATING APPARATUS
Filed March 7, 1930  2 Sheets-Sheet 1

Inventor
Donald H. Reeves.

By Spencer, Hardman, and Fehr.
Attorney

Dec. 15, 1931.  D. H. REEVES  1,836,040
REFRIGERATING APPARATUS
Filed March 7, 1930   2 Sheets-Sheet 2

Inventor
Donald H. Reeves

By Spencer, Hardman, and Zehe.
Attorney

Patented Dec. 15, 1931

1,836,040

UNITED STATES PATENT OFFICE

DONALD H. REEVES, OF DAYTON, OHIO, ASSIGNOR TO FRIGIDAIRE CORPORATION, OF DAYTON, OHIO, A CORPORATION OF DELAWARE

REFRIGERATING APPARATUS

Application filed March 7, 1930. Serial No. 434,095.

This invention relates to refrigerating apparatus and particularly to a method of and apparatus for harvesting and storing ice cubes such as are commonly made in domestic mechanical refrigerators, this application being a continuation in part of my application Serial No. 329,347, filed December 31, 1928.

One of the objects of the invention is to provide a novel method whereby ice cubes or blocks can be readily stored so as to be instantly available for use.

Another object of the invention is to provide means for storing ice blocks in an isolated condition so that single blocks may be readily picked up by hand when desired for use without disturbing the remaining blocks or the apparatus in which they are stored.

Still another object is to provide apparatus for storing ice blocks in which the blocks are preserved without either melting or freezing to the apparatus.

Further objects and advantages of the present invention will be apparent from the following description, reference being had to the accompanying drawings, wherein a preferred form of the invention is clearly shown.

Figure 1:
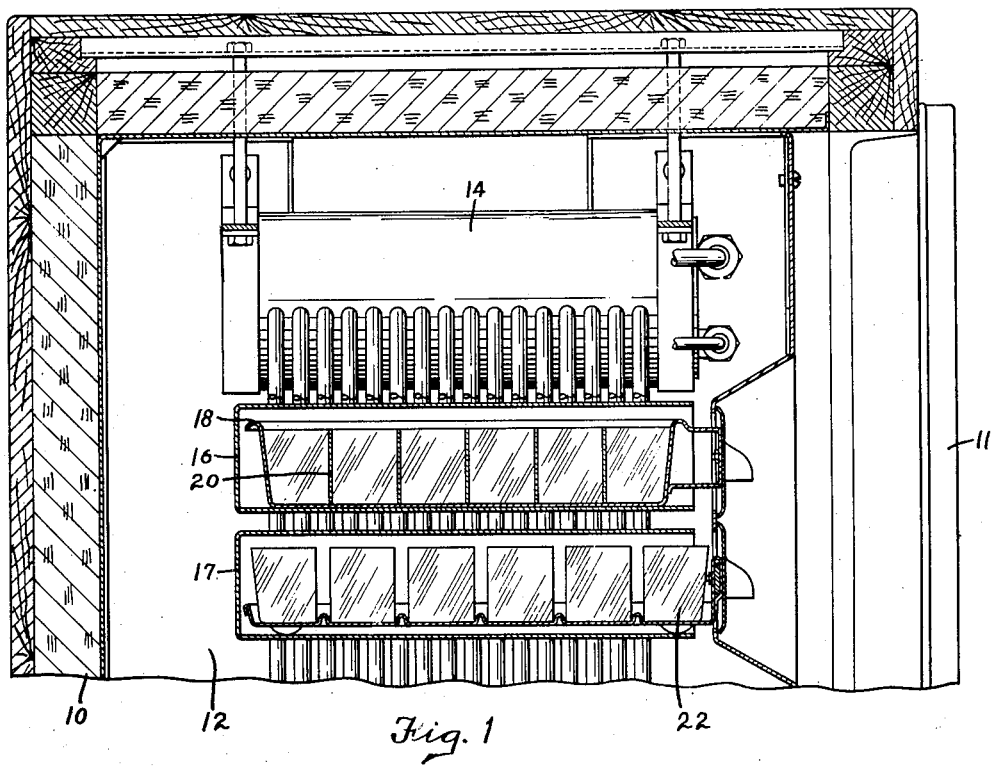
Fig. 1 is a vertical section of a portion of a conventional household mechanical refrigerator with which my invention is used.

In the drawings 10 designates a conventional refrigerating cabinet having a door 11 affording access to a cooling compartment 12 in which is placed any suitable evaporating element 14 which may be for example as shown in the patent to King 1,654,504, December 27, 1927. The evaporator includes one or more freezing chambers or compartments, two such compartments 16 and 17 being shown for the sake of illustration. Water to be frozen into cubes or blocks is placed in a pan or tray 18 which has a grid 20 for dividing the ice so frozen into individual blocks or cubes 22. The tray and grid may be constructed as shown in the patent to King, 1,588,379, June 8, 1926, or the tray may be constructed as shown in the application of Jesse G. King, Serial No. 243,699, filed December 30, 1927 or in any other suitable manner. The grid is removable from the tray as is well known.

Figure 2:
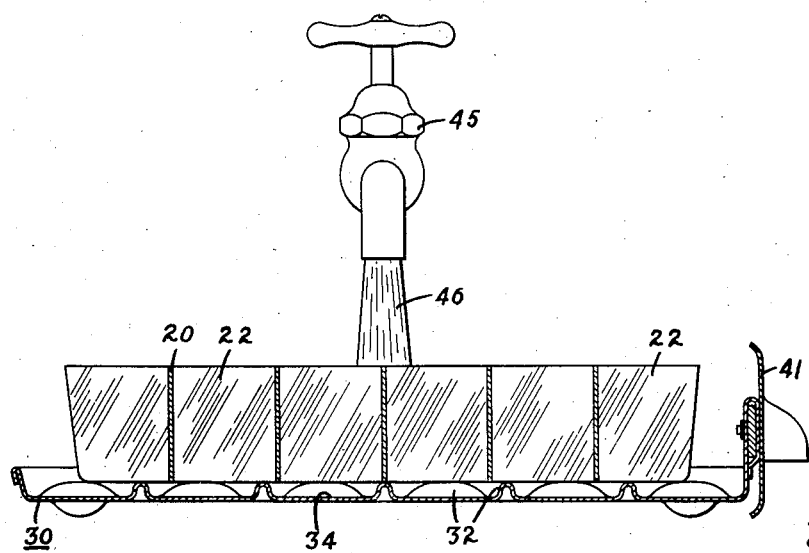
Fig. 2 illustrates a step in the method of harvesting ice blocks and also shows a vertical longitudinal section of an improved storage tray, this section being taken on the line 2—2 of Fig. 3.
Figure 4:
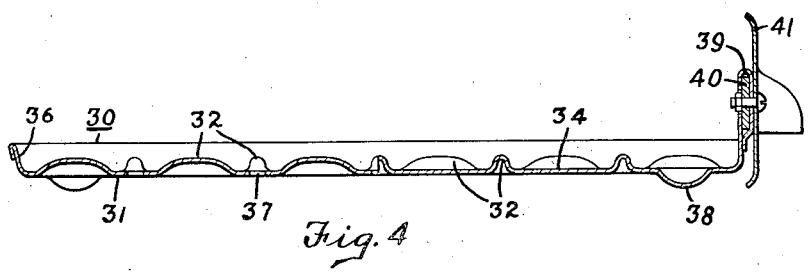
Fig. 4 is a section on the line 4—4 of Fig. 3.
Figure 3:
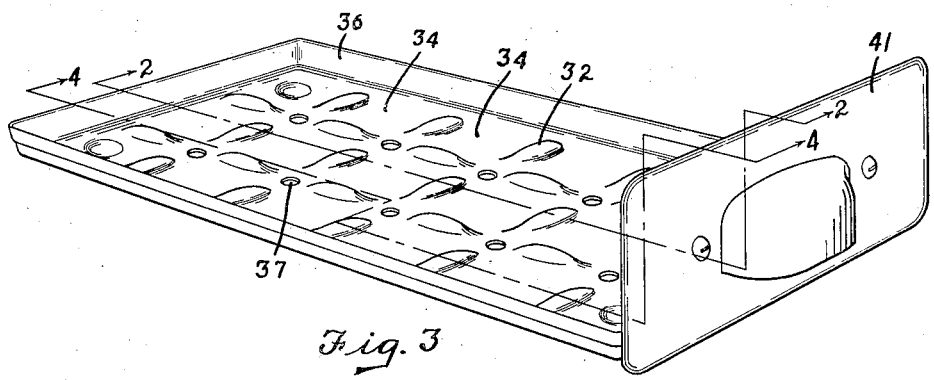
Fig. 3 is a perspective view of the storage tray.

I provide an improved storage tray or receptacle for the ice cubes in the form of a shallow pan or tray as shown in Figs. 3 and 4. The tray 30 has a supporting surface 31 which is sub-divided into a plurality of enclosures by ridges or separators 32 formed integral with the bottom of the tray, being preferably pressed out of the sheet metal of which the tray is formed. These ridges subdivide the surface of the tray into a plurality of substantially flat, smooth, uninterrupted surfaces 34 each of which is adapted to support an individual ice cube. As shown best in Fig. 3 the ridges are short, rounded elevations in the surface 31 which do not extend the entire length of the side of the enclosures 34 but stop or are interrupted at or near the corners. As shown in Figs. 2 and 4 the ridges are rounded in horizontal section as well as in both longitudinal and cross-section. This rounding causes the ridges to contact with ice blocks only over a negligible surface and yet does not present any sharp corner or point to the ice block which would cause melting due to contact pressure. The sides 36 of the tray slope as shown in Fig. 4 conforming in general to the sloping of the sides of the ridges 32 so as to present a negligible contact surface to those blocks which are stored at the edges of the tray. At the corner of each enclosure 34 I provide a drain opening 37. The drains are located entirely outside of the surface which supports the ice blocks. Thus it is impossible for the block to contact with the edge of the drain. Such contact might produce sufficient contact pressures to cause melting and subsequent freezing of the block to the drain. The bottom of the tray is provided with short legs 38 which raise the bottom above any surface upon which the tray is supported and permit water to drain freely through the holes 37. The tray also includes a front portion 39 which may contain a stiffening member 40 and to which is attached a tray front and handle 41 for closing the front for the purpose of withdrawing the tray from the freezing compartment as is more fully shown in the King patent 1,588,379 and the King application above referred to.

The tray is a flexible, self-sustaining structure. By this I mean that it is rigid as the term is employed in household parlance, the tray being stiff enough to sustain itself without noticeable deformation when supported solely by the handle and carrying a full load of ice blocks. However, the tray is flexible in the technical sense, being sufficiently flexable to permit its being twisted slightly between the hands of an ordinary person holding it by both ends. Preferably the tray is also elastic so that after being twisted it returns to its normal shape. Material suitable for forming the tray is thin sheet steel, monel, phosphor bronze or the like.

When it is desired to harvest ice blocks frozen in the tray 18 this may be accomplished by inverting the tray under a spigot and flowing relatively warm water over the bottom of the tray. This melts the grid 20 and all of the ice blocks 22 away from the tray and they are removed as a single block or cake. This cake is then placed on the storage tray 30 as shown in Fig 2 and relatively warm water from a tap 45 flowed over the cake. The tray is moved about under the stream of water 46 so that water flows evenly over the entire mass of ice blocks and grid. This releases all of the blocks 22 from the grid 20 and they drop upon the tray 30. The tray is then placed on any suitable supporting surface and the grid 20 lifted out of the blocks 22. When the grid is removed the blocks slide into their individual compartments 34 due to the rounded shape of the ridges 32 and take the position shown in Fig. 1. The water which flows over the blocks drains out through the openings 37 there being a drain for each individual compartment 34. After the water has drained from the tray 30 the latter is placed for storage in a freezing compartment for example 17 in Fig. 1 wherein the temperature, as is apparent, will be keep below 32° F.

The ridges 32 are of such dimensions that the blocks are spaced from each other as shown in Fig. 1 a sufficient distance to permit the ready removal of any individual block by hand without disturbing the remaining blocks or tipping the tray. When it is desired to use an ice block the user merely withdraws the tray 30 with one hand a sufficient distance from the chamber 17 to permit access to the blocks, and the thumb and index finger of the other hand lifts any desired block out of the tray.

Since the blocks are stored in a dry atmosphere below the freezing point of water the blocks will not melt but will keep indefinitely, subject of course to the usual slow evaporation or sublimation of the ice. Since the blocks are placed and held with their side surfaces totally isolated from each other and from all other objects, the side surfaces can not freeze together. Thus the blocks will remain isolated.

It may occur, in using the above method or apparatus, that the blocks are not sufficiently drained or dried before being placed in the freezing compartment. In such event it may be that the blocks will be frozen to the surfaces 34 by the film of water present when the tray is placed in the freezing chamber. However, I have found that the ice bond so formed is not very strong and that after the tray has been stored in the freezing chamber for a short period of time the tray may be removed and the blocks may usually be loosened from the bottom by a slight pressure produced, for example, by merely pinching the blocks together with the thumb and index finger. Or, by holding the tray by its ends and twisting the ends in opposite directions within the elastic limit of the tray sufficient deformation is produced to release the blocks. Thereafter when the blocks are returned to the chamber they are perfectly dry and cannot freeze to the bottom of the tray. Due to the isolated condition of each block the blocks cannot freeze to each other even when incompletely drained as mentioned above.

The above described invention provides a very convenient means of storing ice blocks so as to be always available without the heretofore customary annoyance of having to melt an individual block out of a mass in a freezing tray, pick apart blocks frozen together or having the blocks melt when stored in some other way.

While the form of embodiment of the invention as herein disclosed constitutes a preferred form, it is to be understood that other forms might be adopted, all coming within the scope of the claims which follow.

What is claimed is as follows:

1. Means for storing ice blocks for domestic use, comprising a tray adapted to support ice blocks within the freezing chamber of a domestic mechanical refrigerator, and means for keeping the blocks separated from each other, said means contacting with the blocks only over a negligible surface.

2. Means for storing ice blocks for domestic use comprising a tray adapted to support ice blocks within the freezing chamber of a domestic mechanical refrigerator, the bottom of said tray being bulged at a plurality of spaced apart points for keeping the blocks separated from each other, the bulged portions of the bottom extending upwardly a short distance only permitting the ready removal of individual blocks by the hand without tilting the tray.

3. Means for storing ice blocks for domestic use comprising a tray adapted to support ice blocks within the freezing chamber of a domestic mechanical refrigerator, means for subdividing the surface of the tray into enclosures each adapted to contain an individual block, and a drain for each enclosure.

4. Means for storing ice blocks for domestic use comprising a tray adapted to support ice blocks within the freezing chamber of a domestic mechanical refrigerator, means for subdividing the surface of the tray into enclosures each adapted to contain an individual block, and a drain for each enclosure, said drains being so located with reference to the subdividing means as to prevent contact of the ice blocks with the drains.

5. Means for storing ice blocks for domestic use comprising a tray adapted to support ice blocks within the freezing chamber of a domestic mechanical refrigerator, means for subdividing the surface of the tray into enclosures each adapted to contain an individual block, the bottom surface of each enclosure being uninterrupted and smooth, and a drain for each enclosure.

6. Apparatus as defined in claim 3 wherein the enclosures are rectangular and the drains are located in the corners between the enclosures.

7. Apparatus as defined in claim 3 wherein the subdividing means are interrupted at the corners of the enclosures.

8. Means for storing ice blocks for domestic use comprising a tray adapted to support ice blocks within the freezing chamber of a domestic mechanical refrigerator, and ridges formed integral with the bottom of the tray for keeping the blocks separated from each other, said ridges being adapted to contact with the blocks only over a negligible surface.

9. Apparatus as defined in claim 8 wherein the ridges are rounded in cross-section.

10. Apparatus as defined in claim 8 wherein the ridges are rounded both in longitudinal section and cross-section.

11. Means for storing ice blocks for domestic use, comprising a tray adapted to support ice blocks within the freezing chamber of a domestic mechanical refrigerator, and means for keeping the blocks separated from each other, said means being of such width so as to maintain the blocks with substantially their total side surfaces separated from other objects.

12. Means for storing ice blocks for domestic use, comprising a flexible, self-sustaining tray adapted to support ice blocks within the freezing chamber of a domestic mechanical refrigerator, and means for keeping the blocks separated from each other, said means contacting with the blocks only over a negligible surface, and being of such width so as to maintain the blocks with substantially their total side surfaces separated from other objects.

13. Means for storing ice blocks for domestic use, comprising an elastic, self-sustaining tray adapted to support ice blocks within the freezing chamber of a domestic mechanical refrigerator, and means for keeping the blocks separated from each other, said means contacting with the blocks only over a negligible surface, and being of such width so as to maintain the blocks with substantially their total side surfaces separated from other objects.

In testimony whereof I hereto affix my signature.

DONALD H. REEVES.